United States Patent
Shin et al.

(10) Patent No.: US 10,514,266 B2
(45) Date of Patent: Dec. 24, 2019

(54) METHOD AND SYSTEM FOR DISPLAYING DISTANCE TO EMPTY OF VEHICLE

(71) Applicants: Hyundai Motor Company, Seoul (KR); Kia Motors Corporation, Seoul (KR)

(72) Inventors: Sooyoung Shin, Seongnam-si (KR); Sangwoo Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/839,577

(22) Filed: Dec. 12, 2017

(65) Prior Publication Data
US 2019/0078903 A1 Mar. 14, 2019

(30) Foreign Application Priority Data
Sep. 13, 2017 (KR) .................. 10-2017-0116984

(51) Int. Cl.
*G01C 21/34* (2006.01)
*G07C 5/00* (2006.01)
*G07C 5/08* (2006.01)
*G07C 5/02* (2006.01)

(52) U.S. Cl.
CPC ......... *G01C 21/3469* (2013.01); *G07C 5/004* (2013.01); *G07C 5/008* (2013.01); *G07C 5/02* (2013.01); *G07C 5/0841* (2013.01)

(58) Field of Classification Search
USPC ....................................................... 701/22
See application file for complete search history.

(56) References Cited

U.S. PATENT DOCUMENTS

| | | | |
|---|---|---|---|
| 5,539,399 A | 7/1996 | Takahira et al. | |
| 8,417,401 B2 | 4/2013 | Takahara et al. | |
| 2009/0139781 A1* | 6/2009 | Straubel | B60L 50/64 180/65.1 |
| 2010/0094496 A1* | 4/2010 | Hershkovitz | B60L 3/12 701/22 |
| 2011/0288765 A1* | 11/2011 | Conway | G01C 21/3469 701/533 |
| 2012/0059526 A1* | 3/2012 | Maini | B60L 15/2045 700/291 |

(Continued)

FOREIGN PATENT DOCUMENTS

| | | |
|---|---|---|
| JP | 2006275774 A | 10/2006 |
| JP | 2009025128 A | 2/2009 |

(Continued)

*Primary Examiner* — Tyler D Paige
(74) *Attorney, Agent, or Firm* — Slater Matsil, LLP

(57) ABSTRACT

Disclosed herein are a method and a system for displaying a distance to empty (traveling range) of a vehicle, capable of updating the distance to empty more quickly by reducing an amount of computation for calculating the distance to empty (traveling range) of the vehicle. The method includes calculating a distance to empty reachable with current energy of a vehicle based on status information of the vehicle and displaying the calculated distance to empty on a display; and recalculating a distance to empty by reflecting only changed pieces of the status information of the vehicle to update the distance to empty, and replacing the distance to empty displayed on the display with the updated distance to empty.

20 Claims, 5 Drawing Sheets

(56) References Cited

U.S. PATENT DOCUMENTS

| | | | | |
|---|---|---|---|---|
| 2012/0221189 A1* | 8/2012 | Konet et al. | ......... | G01C 22/006 |
| | | | | 701/29.1 |
| 2013/0253740 A1* | 9/2013 | Kim | ........................ | B60L 58/12 |
| | | | | 701/22 |
| 2013/0311016 A1* | 11/2013 | Kim | ...................... | B60W 40/12 |
| | | | | 701/22 |
| 2014/0074329 A1* | 3/2014 | Yang | ........................ | B60L 58/12 |
| | | | | 701/22 |
| 2014/0074390 A1* | 3/2014 | Williams | .................. | G06F 7/00 |
| | | | | 701/123 |
| 2014/0163877 A1* | 6/2014 | Kiyama | ............. | G01C 21/3469 |
| | | | | 701/533 |
| 2014/0278038 A1* | 9/2014 | Stankoulov | ........ | G01C 21/3469 |
| | | | | 701/123 |
| 2015/0142262 A1* | 5/2015 | Lee | ...................... | G07C 5/0825 |
| | | | | 701/36 |
| 2016/0245662 A1* | 8/2016 | Rajagopalan | ...... | G01C 21/3469 |
| 2016/0311423 A1* | 10/2016 | Storm | .................... | G06Q 50/30 |

FOREIGN PATENT DOCUMENTS

| | | |
|---|---|---|
| JP | 2010169423 A | 8/2010 |
| JP | 2012078251 A | 4/2012 |
| JP | 2012242329 A | 12/2012 |
| JP | 2014145748 A | 8/2014 |
| JP | 5606559 B2 | 10/2014 |
| KR | 1020130050461 A | 5/2013 |

* cited by examiner ( A )

( B )

METHOD AND SYSTEM FOR DISPLAYING DISTANCE TO EMPTY OF VEHICLE

CROSS-REFERENCE TO RELATED APPLICATIONS

This application claims the benefit of Korean Patent Application No. 10-2017-03116984, filed on Sep. 13, 2017 in the Korean Intellectual Property Office, the disclosure of which is incorporated herein by reference.

TECHNICAL FIELD

Embodiments of the present disclosure relate to a vehicle, and more particularly, to an eco-friendly vehicle using power stored in a battery as energy.

BACKGROUND

Examples of eco-friendly vehicles that use electrical energy of batteries include electric vehicles, plug-in hybrid vehicles, and hydrogen fuel cell vehicles. The electric vehicle and the plug-in hybrid vehicle are supplied with power from a charging device provided in an external charging station to charge a battery. The hydrogen fuel cell vehicle is configured to convert hydrogen into electrical energy to charge a battery.

Internal combustion engine vehicles using gasoline or diesel can be easily supplied with fuel because gas stations for supplying gasoline or diesel are widely distributed. However, since the distribution rate of charging stations for electric vehicles, plug-in hybrid vehicles, and hydrogen fuel cell vehicles is very low, it is necessary to periodically check the amount of electricity remaining in a battery of the vehicle or the amount of hydrogen remaining in a hydrogen fuel tank while paying close attention to the resupply of electricity and hydrogen by monitoring the distance to empty of the vehicle.

In this regard, a function of displaying the distance to empty based on the remaining power of the battery or the remaining amount of the hydrogen to allow a driver to recognize the distance to empty is very important in an eco-friendly vehicle.

To this end, the eco-friendly vehicle displays the distance to empty (traveling range) based on remaining energy (electricity or hydrogen) on a navigation map so that the driver can easily recognize and refer to the distance to empty. However, when the eco-friendly vehicle is traveling, the position of the eco-friendly vehicle changes and the remaining energy also changes. Since the distance to empty (traveling range) is calculated again based on the remaining energy whenever the position of the eco-friendly vehicle changes and displayed on the navigation map, the computation time and graphic processing time may become longer due to a large amount of computation, so that the distance to empty (traveling range) of the vehicle is not immediately updated on the navigation map. Due to such a delay, the distance to empty of the vehicle cannot be updated in real time on the navigation map. For this reason, the marketability of a navigation system or the eco-friendly vehicle may be degraded.

SUMMARY

Therefore, it is an aspect of the present disclosure to provide more quickly updating a distance to empty (traveling range) of a vehicle by reducing an amount of computation for calculating the distance to empty (traveling range) of the vehicle.

Additional aspects of the disclosure will be set forth in part in the description which follows and, in part, will be obvious from the description, or may be learned by practice of the disclosure.

In accordance with one aspect of the present disclosure, a method of displaying a distance to empty (DTE) of a vehicle includes calculating a DTE reachable with current energy of a vehicle based on status information of the vehicle and displaying the calculated DTE on a display, and recalculating a DTE by reflecting only changed pieces of the status information of the vehicle to update the DTE, and replacing the DTE displayed on the display with the updated DTE.

The calculating of the DTE based on the status information of the vehicle may be performed by reflecting all pieces of preset status information of the vehicle.

The DTE may be repeatedly updated by reflecting only changed pieces of the status information after the calculating of the DTE is completed.

The status information of the vehicle may include at least one of a position of the vehicle, a remaining amount of fuel in the vehicle, and a driving condition of the vehicle.

The calculating of the DTE may be performed in a remote server, and a calculation result of the server may be transmitted to the vehicle.

The DTE of the vehicle displayed on the display may indicate an area around the vehicle displayed on the display, wherein the area allows the vehicle to travel with the current energy.

In accordance with another aspect of the present disclosure, a method of displaying a distance to empty (DTE) of a vehicle includes calculating a DTE reachable with current energy of a vehicle by reflecting all pieces of preset status information of the vehicle, and displaying the calculated DTE on a display, recalculating the DTE by reflecting only changed pieces of the status information of the vehicle to update the DTE, and replacing the DTE displayed on the display with the updated DTE, and repeatedly updating the DTE by reflecting only changed pieces of the status information.

The status information of the vehicle may include at least one of a position of the vehicle, a remaining amount of fuel in the vehicle, and a driving condition of the vehicle.

The calculating of the DTE may be performed in a remote server, and a calculation result of the server may be transmitted to the vehicle.

The DTE of the vehicle displayed on the display may indicate an area around the vehicle displayed on the display, wherein the area allows the vehicle to travel with the current energy.

In accordance with still another aspect of the present disclosure, a system for displaying a distance to empty (DTE) of a vehicle includes a server configured to calculate a first DTE reachable with current energy of a vehicle based on status information of the vehicle and calculate a second DTE by reflecting only changed pieces of the status information of the vehicle to update the first DTE with the second DTE, and an audio video navigation system configured to receive the first DTE from the server to display the first DTE on a display, and receive the second DTE from the server to replace the first DTE displayed on the display with the second DTE.

The first DTE may be calculated by reflecting all pieces of preset status information of the vehicle.

The update may be repeatedly performed by reflecting only changed pieces of the status information after the calculation of the first DTE is completed.

The status information of the vehicle may include at least one of a position of the vehicle, a remaining amount of fuel in the vehicle, and a driving condition of the vehicle.

The DTE displayed on the display may indicate an area around the vehicle displayed on the display, wherein the area allows the vehicle to travel with the current energy.

One general aspect of embodiments disclosed herein includes a method of displaying a distance to empty (DTE) of a vehicle, the method including: calculating a DTE reachable with a current energy level of the vehicle, the calculating including computations on a set of status information values of the vehicle; displaying the calculated DTE on a display of the vehicle; recalculating the DTE to obtain an updated DTE, the recalculating including computations for only a sub-set of the status information values of the vehicle, the sub-set being those status information values that have changed since the calculating step; and replacing the DTE displayed on the display with the updated DTE.

Another general aspect of embodiments disclosed herein includes a method of displaying a distance to empty (DTE) of a vehicle, the method including: calculating a DTE reachable with a current energy level of the vehicle by incorporating into the calculation all values of preset status information of the vehicle; displaying the calculated DTE on a display in the vehicle; recalculating the DTE to generate an updated DTE by incorporating into the recalculation only values of the preset status information of the vehicle that have changed since the calculating step; replacing the DTE displayed on the display with the updated DTE; and periodically repeating the step of recalculating the DTE to generate an updated DTE.

Yet another general aspect of embodiments disclosed herein includes a system for displaying a distance to empty (DTE) of a vehicle, the system including: a server configured to calculate a first DTE reachable with a current energy level of the vehicle based on a first set of status information values of the vehicle using a set of computations, and to calculate a subsequent DTE based on a subsequent set of status information values of the vehicle, where at least one value of the subsequent set of status information values of the vehicle is different from a corresponding value of the first set of status information values of the vehicle (a different value), and where the subsequent DTE is calculated by performing only a sub-set of computations the sub-set being defined as those computations necessary to reflect the impact of the different value on the subsequent DTE relative to the first DTE; and an audio video navigation system configured to receive the first DTE from the server to display the first DTE on a display, and receive the subsequent DTE from the server to replace the first DTE displayed on the display with the subsequent DTE.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Figure 1:
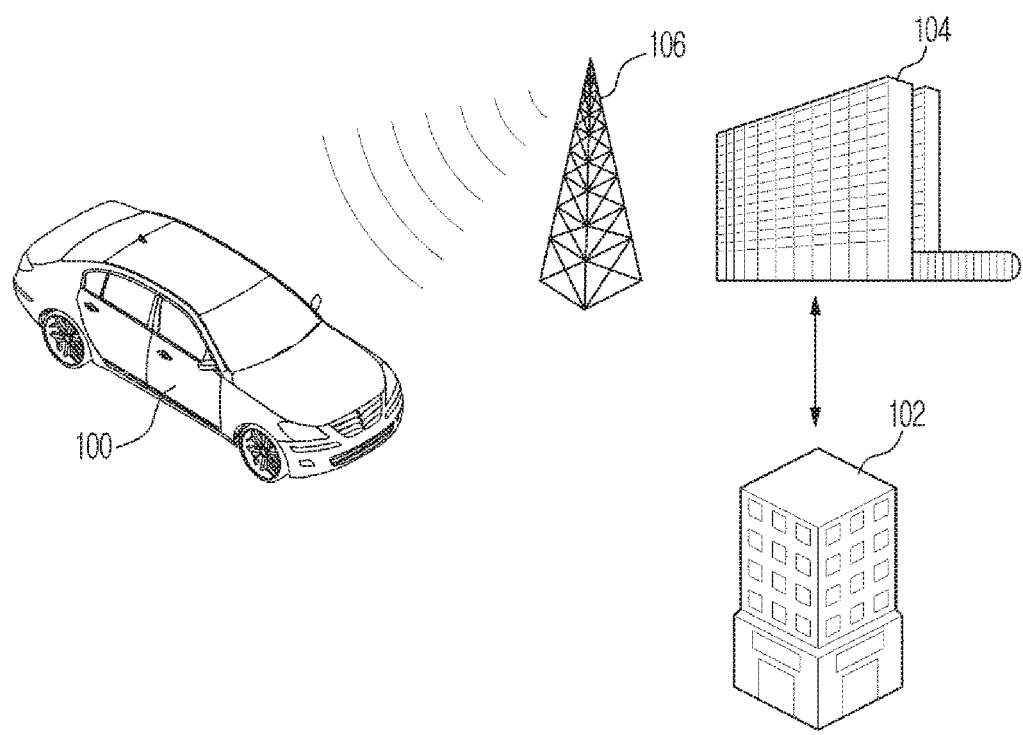
FIG. 1 is a view illustrating a telematics system of a vehicle in accordance with one embodiment of the present disclosure.

Reference will now be made in detail to the embodiments of the present disclosure, examples of which are illustrated in the accompanying drawings, wherein like reference numerals refer to like elements throughout.

FIG. 1 is a view illustrating a telematics system of a vehicle in accordance with one embodiment of the present disclosure.

As illustrated in FIG. 1, a vehicle 100 communicates with a telematics center (also referred to as a TMS center) 102. Communication is performed between the vehicle 100 and the telematics center 102 via a wireless communication network 106 of a telecommunication company 104.

According to the embodiment of the present disclosure, as status information of the vehicle 100 is supplied to the telematics center 102 from the vehicle 100, the telematics center 102 calculates a distance to empty (DTE) in relation to all routes around the vehicle 100 based on the status information of the vehicle 100 and provides the DTE to the vehicle 100. The vehicle 100 displays the DTE provided from the telematics center 102 on a navigation map, so that a driver can recognize the DTE.

According to the embodiment of the present disclosure, the DTE of the vehicle 100 is calculated once, and then the DTE is calculated again by reflecting only changed pieces of the status information of the vehicle 100. That is, when the DTE is updated, the DTE is calculated again by reflecting only conditions that have been changed from the previous conditions, without repeating the calculation in relation to all traveling routes, so the amount of computation can be remarkably reduced when calculating the DTE.

Figure 2:
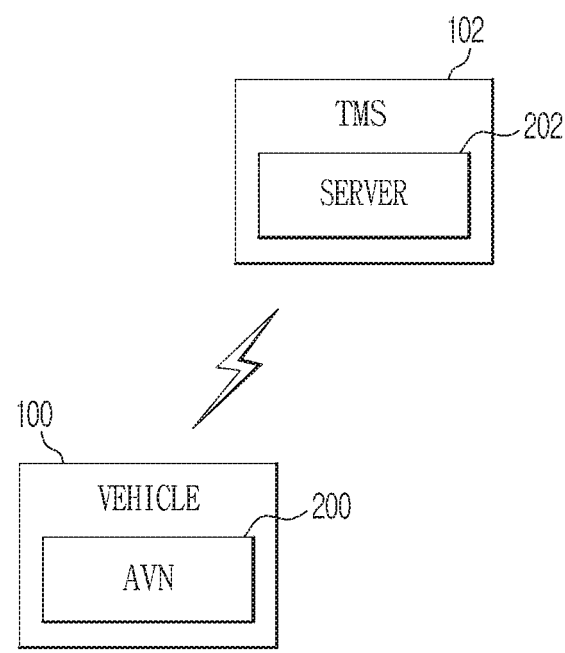
FIG. 2 is a view illustrating a communication system between a vehicle (100) and a telematics center (102) of FIG. 1.

FIG. 2 is a view illustrating a communication system between the vehicle 100 and the telematics center 102 of FIG. 1.

As illustrated in FIG. 2, an audio video navigation (AVN) system 200 of the vehicle 100, which is a multimedia system, is involved in communication with the telematics center 102, and a server 202 of the telematics center 102 is involved in communication with the vehicle 100.

That is, the AVN system 200 of the vehicle 100 transmits status information of the vehicle 100 to the server 202 of the telematics center 102, and the server 202 of the telematics center 102 calculates a DTE of the vehicle 100 based on the status information of the vehicle 100 and transmits information about the calculated DTE to the AVN system 200 of the vehicle 100.

The AVN system 200 of the vehicle 100 receives the information on the DTE from the server 202 of the telematics center 102 and displays the DTE on the navigation map.

Figure 3:
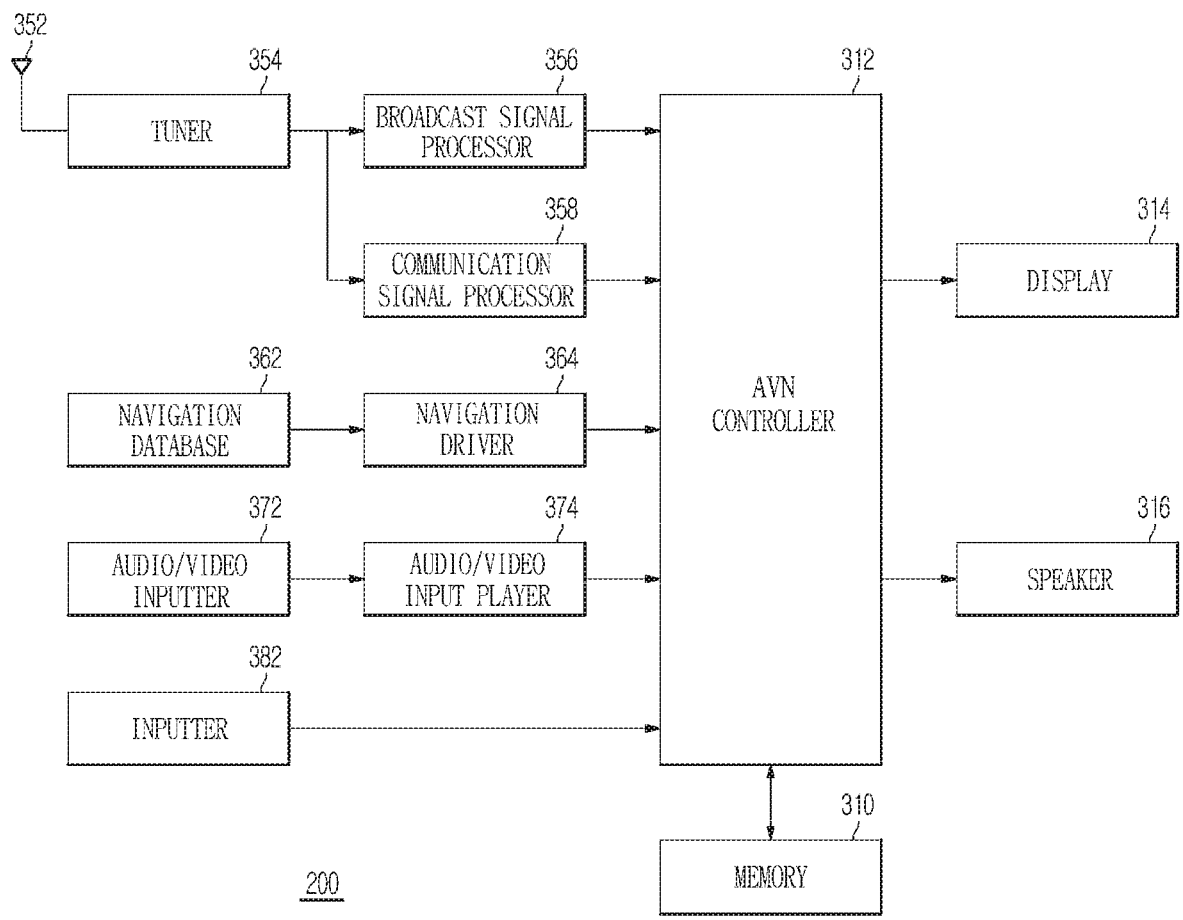
FIG. 3 is a view illustrating an audio video navigation (AVN) system of the vehicle in accordance with the embodiment of the present disclosure.

FIG. 3 is a view illustrating the AVN system 200 of the vehicle in accordance with the embodiment of the present disclosure. As illustrated in FIG. 3, the configuration of the AVN system 200 may be divided into components for a general input function, components for a broadcast/communication function, components for a navigation function, components for an audio/video function, and components commonly used for a plurality of functions.

The components for the broadcast/communication function may include an antenna 352, a tuner 354, a broadcast signal processor 356, and a communication signal processor 358. The components for the navigation function may include a navigation database 362 and a navigation driver 364. The components for the audio/video function may include an audio/video inputter 372 and an audio/video player 374. The components for the general input function may include an inputter 382. Components commonly used for a plurality of functions may include a memory 310, a controller 312, a display 314, and a speaker 316. This functional division is not limited to the above, and a component for one function may be used for another function.

The antenna 352 is a device for receiving or transmitting radio waves from or in the air for the purpose of receiving a broadcast signal or transmitting and receiving a communication signal. The antenna 352 is connected to the tuner 354 to communicate with the tuner 354. Therefore, the radio waves received by the antenna 352 are transmitted to the tuner 354. The antenna 352 may include a plurality of antennas for a plurality of different types of broadcast/communication signals.

The tuner 354 receives the radio wave through the antenna 352 and converts the radio wave into an intermediate frequency signal or the like. In addition, the tuner 354 converts a data signal, which will be transmitted, into a signal having a form that can be propagated in the air, and sends the data signal in the air through the antenna 352. That is, the tuner 354 performs operations such as extracting only a signal in a specific band or combining a data signal with a carrier signal. The tuner 354 receives broadcast signals and transceives communication signals. The communication signal may include a communication signal for telematics. When the controller 312 transmits a control signal and transmission data for transmitting the telematics signal to the tuner 354, the tuner 354 converts the transmission data into a signal having a form that can be propagated in the air in response to the control signal transmitted from the controller 312 and transmits the converted signal in the air through the antenna 352.

The communication signal processor 358 performs processing of communication signals with global positioning system (GPS) satellites as well as processing of a telematics communication signal. That is, the communication signal processor 358 converts the received communication signal into a signal having a form of data to be transmitted to the controller 312 or converts data received from the controller 312 into a form of a communication signal to be transmitted through the tuner 354 and the antenna 352.

The navigation database 362 includes data for implementing navigation. The navigation driver 364 configures a navigation image on the display 314 using the data provided from the navigation database 362. To this end, the navigation driver 364 receives navigation setting information, such as a destination, waypoints, and a route form set by the driver, from the controller 312. In addition, the navigation driver 364 receives current position information of the vehicle, which is obtained through the communication with the GPS satellites, from the controller 312 in order to implement navigation. Especially, the navigation driver 364 displays a DTE on the display 314 based on information of the DTE received from the telematics center 102.

The audio/video inputter 372 may include an optical disc drive. The audio/video player 374 allows audio/video data input through the audio/video inputter 372 to be output to the speaker 316 or the display 314.

The inputter 382 may include at least one button provided on the AVN system 200 or a touch screen implemented on the display 314. A driver may select one of the composite functions of the AVN system 200 by manipulating the inputter 382 and may apply various settings so that the desired operation can be performed from the selected function.

The controller 312 performs overall control required for operations of the audio, video, and navigation of the AVN system 200. For example, especially, the controller 312 may control the navigation driver 364 to display the DTE on the display 314 based on information of DTE received from the telematics center 102.

The memory 310 may be configured to store various applications which are executed to perform the broadcast/communication function, the navigation function, and the audio/video function of the AVN system 200 as well as image display data, voice data, sound effect data required for executing the applications.

The display 314 outputs a video accompanying the composite functions of the AVN system 200, such as the broadcast/communication function, the navigation function, and the audio/video function. For example, a guide screen for each function, a message, video data, and the like may be output through the display 314.

The speaker 316 outputs an audio accompanying the composite functions of the AVN system 200, such as the broadcast/communication function, the navigation function, and the audio/video function. For example, announcements for each function, sound effects, audio data, and the like may be output through the speaker 316.

Figure 4:
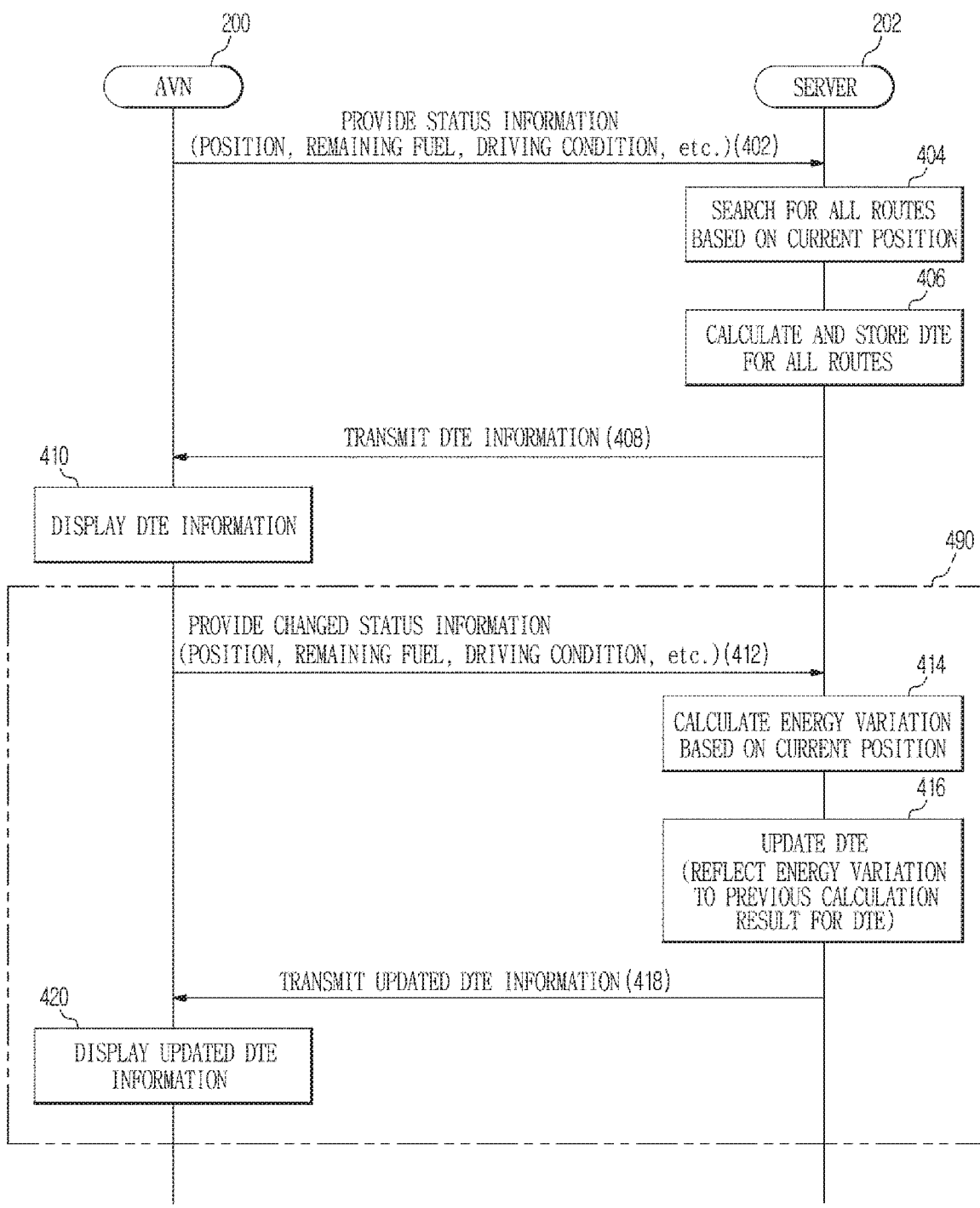
FIG. 4 is a view illustrating a method of displaying a distance to empty of the vehicle in accordance with the embodiment of the present disclosure.

FIG. 4 is a view illustrating a method of displaying the DTE of the vehicle in accordance with the embodiment of the present disclosure.

The AVN system 200 of the vehicle 100 provides status information of the vehicle 100 to the server 202 of the telematics center 102 (402). The status information of the vehicle 100 is used as data for calculating a DTE of the vehicle 100. The status information of the vehicle 100 may include a position of the vehicle 100, a remaining amount of fuel in the vehicle, driving conditions of the vehicle, and the like. The status information of the vehicle 100 may not be limited to the position of the vehicle 100, the remaining amount of fuel in the vehicle 100, and the driving conditions of the vehicle, but may further include other conditions required for more accurately calculating a DTE.

The position of the vehicle 100 may be a position displayed on the navigation map based on GPS values.

The remaining amount of fuel may be a current state of charge (SOC) of a main battery in the case of an electric vehicle or a remaining amount of hydrogen in the case of a hydrogen fuel cell vehicle. In the case of a vehicle equipped with an internal combustion engine, a remaining amount of fuel may be a remaining amount of diesel, gasoline, or liquefied petroleum gas (LPG). That is, the vehicle 100 in accordance with the embodiment of the present disclosure may be an eco-friendly vehicle for which there are not enough electricity/hydrogen charging stations, or an internal combustion engine vehicle for which gas stations for supplying diesel, gasoline, or LPG are widely distributed.

The driving condition is a factor that may exert an influence upon fuel consumption of the vehicle 100, and for example, the driving condition may include the vehicle speed, the use of the air conditioner, and the like.

The server 202 of the telematics center 102 searches for all travel routes around the vehicle 100 based on the current position of the vehicle 100 (404).

The server 202 of the telematics center 102 calculates and stores a DTE in relation to all travel routes that have been retrieved (406). In other words, the server 202 calculates a maximum distance that can be traveled using a remaining amount of fuel in relation to the travel routes that have been retrieved and stores the calculation result.

The altitude of the route for traveling of the vehicle 100, the traffic situation, and the driving speed thereof may be taken into consideration when the server 202 calculates the DTE. In other words, even when the vehicle travels the same distance, fuel consumption may vary depending on the altitude and the traffic situation. Therefore, it is possible to more accurately calculate the DTE based on the remaining amount of fuel when the factors influencing fuel consumption are taken into consideration when calculating the DTE.

The server 202 of the telematics center 102 transmits information of the calculated DTE to the AVN system 200 of the vehicle 100 (408).

The AVN system 200 of the vehicle 100 graphically displays the information of the DTE received from the server 202 of the telematics center 102 on the navigation map of the display 314.

Figure 5:
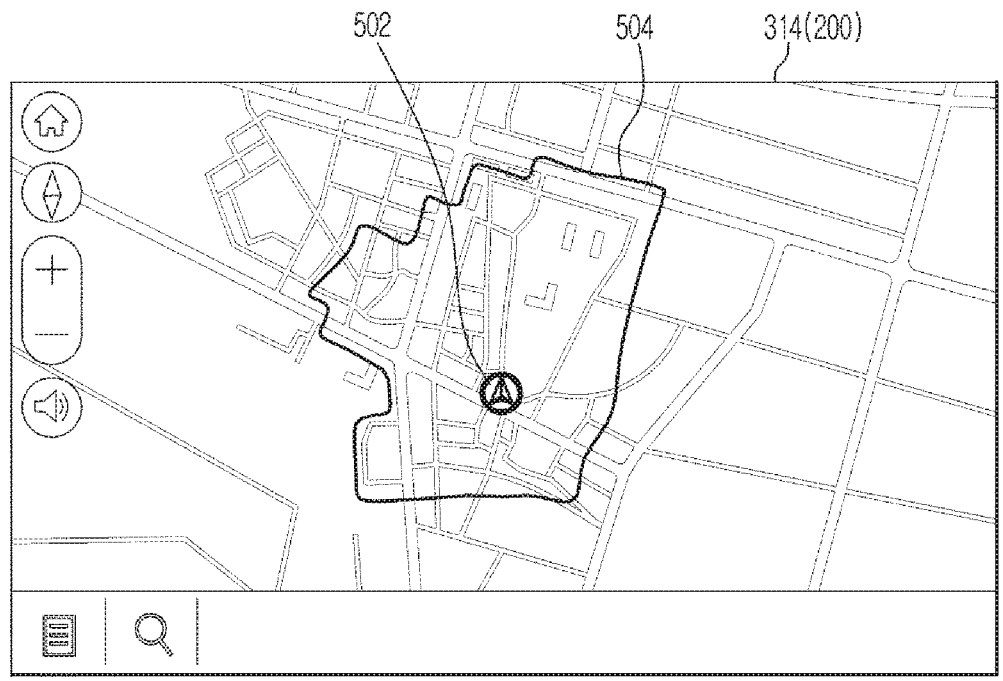
FIG. 5 is a view illustrating navigation images displayed on a display (314) of an AVN system (200) of the vehicle in accordance with the embodiment of the present disclosure.
Figure 5:
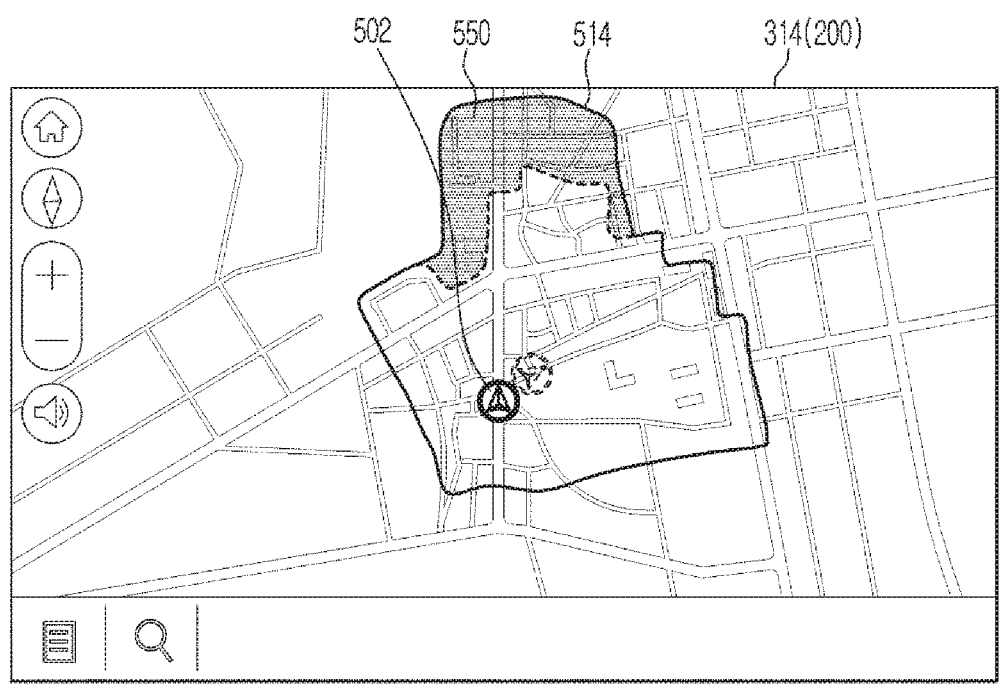

FIG. 5 is a view illustrating navigation images displayed on the display 314 of the AVN system 200 of the vehicle in accordance with the embodiment of the present disclosure. FIG. 5A is view illustrating information of the DTE received from the server 202 of the telematics center 102, which is graphically displayed on the navigation map of the display 314. For reference, FIG. 5B is a view illustrating information of the updated DTE which is graphically displayed on the navigation map of the display 314. FIG. 5B will be described in detail below when describing operation 420.

In this manner, while the DTE calculated based on the current position of the vehicle 100 is being graphically displayed on the navigation map, the AVN system 200 transmits changed status information of the vehicle 100 to the server 202 of the telematics center 102 (412). The status information of the vehicle 100 is changed while the vehicle 100 is traveling. Typically, the position and the traveling direction of the vehicle 100, the remaining amount of fuel, and the like may be changed. Such a change in the status information of the vehicle 100 may influence the DTE of the vehicle 100, so the change in the status information of the vehicle 100 is preferably delivered to the server 202 in real time (for example, at intervals of one second) such that the change can be considered in the calculation of the DTE.

Upon receiving the changed status information of the vehicle 100, the server 202 of the telematics center 102 calculates an amount of energy variation in the vehicle 100 by reflecting the changed status information, particularly, the position change of the vehicle 100 (414). The server 202 of the telematics center 102 calculates an amount of energy variation in the vehicle 100 by reflecting the changed status information, particularly, branch variation around the vehicle 100. The amount of energy variation in the vehicle 100 may be a main indicator indicating the change of the DTE of the vehicle 100.

The server 202 of the telematics center 102 newly updates the DTE by reflecting the amount of energy variation obtained in operation 414 in the previous DTE obtained in operation 406 (416). There is a difference between the calculation of the DTE in operation 406 and the calculation of the DTE in operation 416 as follows.

The calculation of the DTE in operation 406 is performed using all values of preset status information. Since the DTE is calculated for all travel routes that have been retrieved and for all values of preset status information that have been retrieved, the time required for the calculation is remarkably large due to the large amount of computation. Stated another way, calculation of the DTE in operation 406 could involve hundreds or thousands of separate computations because computations must be performed for a full set of values of preset status information. And, these hundreds or possible thousands of separate computations must be performed for each of the several possible travel routes.

In contrast, the recalculation of the DTE in operation 416 is performed using only a sub-set of the preset status information, e.g., only those values that have changed or been updated since operation 406, such as the position of the vehicle 100. Since the DTE is recalculated by reflecting only changed conditions while excluding conditions that have not been changed since operation 406, the amount of computation in operation 416 is relatively less than the amount of computation in operation 406, so that the time required for the recalculation can be remarkably reduced. In other words, in operation 416, computations must be performed for only a subset of the values of preset status information, that sub-set being only those values that have changed since the previous DTE calculation 406. On the other hand, computations involving those values of preset status information that have not changed since the previous DTE calculation 406 do not need to be re-performed.

The server 202 of the telematics center 102 transmits information of a newly updated DTE to the AVN system 200 (418).

Upon receiving the information of the newly updated DTE from the server 202 of the telematics center 102, the AVN system 200 updates the DTE displayed on the navigation map of the display 314 by reflecting the information of the newly updated DTE (420).

As illustrated in FIG. 5B briefly mentioned above, the AVN system 200 graphically displays a new DTE on the navigation map by reflecting the updated DTE. Referring to a vehicle 502 and a DTE 514 indicated by a solid line in FIG. 5B, only a part of the DTE 514 is updated in comparison with the previous DTE indicated by a dotted line, and the remaining portion of the DTE 514 is the same as in the previous DTE. That is, as illustrated in FIG. 5B, when a second DTE is calculated, it is possible to reduce the computation time because the second DTE is calculated by reflecting only the changed conditions.

A portion indicated by reference numeral 550 in FIG. 5B is an updated portion which is obtained by reflecting only the changed conditions. Since the computation in the server 202 is performed on only an area denoted by reference numeral 550, the amount of computation is reduced and the computation time is shortened, so that the interval for updating and displaying the DTE on the display 314 may be shortened.

Since the computation time for the DTE is shortened in operation 416, the DTE can be continuously and naturally displayed on the navigation map without being interrupted when the DTE is graphically displayed on the navigation map of the display 314 of the AVN system 200.

When the computation process for the DTE performed in operation 406 is repeatedly performed even in operation 416, the DTE may be intermittently displayed on the navigation map whenever the DTE is calculated due to the long computation time, thereby causing inconvenience for the driver and degrading the marketability of the vehicle (or AVN system).

In contrast, when a new DTE is calculated by reflecting only the changed conditions in operation 416 after primarily calculating the DTE based on all pieces of status information in operation 406, the computation time required for the calculation of the DTE can be remarkably reduced. As the computation time is shortened, the graphics of the DTE can be continuously and naturally displayed on the navigation map. That is, the reduction of computation time is an important factor that increases convenience for the driver and improves the marketability of the vehicle (or AVN system).

The operations in an area denoted by reference numeral 490 in FIG. 4 are repeatedly performed at predetermined time intervals (for example, one second) until the vehicle 100 stops operating or the navigation function of the AVN system 200 is turned off. Meanwhile, the predetermined time interval of one second is only one example of the present disclosure, and the predetermined time interval may signify an update interval of the DTE, capable of allowing the DTE to be graphically displayed on the navigation map continuously and naturally.

As is apparent from the above description, a distance to empty (traveling range) of a vehicle can be updated more quickly by reducing an amount of computation for calculating the distance to empty (traveling range) of a vehicle.

The above description is merely illustrative of the technical idea, and it should be appreciated by those skilled in the art that various modifications, changes and substitutions will be possible without departing from the essential characteristics of the present disclosure. Therefore, the embodiments and the accompanying drawings described above are intended to illustrate and not limit the technical idea, and the scope of technical idea is not limited by the embodiments and accompanying drawings. The scope of rights to be protected should be interpreted by the following claims, and all technical ideas which are within the scope of the present disclosure shall be construed as being included in the scope of the right.

What is claimed is:

1. A method of displaying a distance to empty (DTE) in a vehicle, the method comprising:
   collecting, by a controller, a set of state information values of the vehicle;
   receiving, from a server, a calculated DTE reachable with a current energy level of the vehicle, the calculation of the DTE including computations on the entire set of status information values of the vehicle;
   displaying, by the controller, the calculated DTE on a display installed inside the vehicle;
   receiving, from the server, a recalculated DTE to obtain an updated DTE, the DTE being recalculated using computations for only a sub-set of the status information values of the vehicle, the sub-set being those status information values that have changed since the calculating step; and
   replacing, by the controller, the DTE displayed on the display with the updated DTE.

2. The method according to claim 1, wherein the calculating of the DTE based on the status information of the vehicle is performed by performing computations for all values of preset status information of the vehicle.

3. The method according to claim 2, wherein the DTE is repeatedly updated by performing computations for only a sub-set of the status information values that have changed since the calculating step, after the calculating of the DTE is completed.

4. The method according to claim 1, wherein the status information of the vehicle includes at least one of a position of the vehicle, a remaining amount of fuel in the vehicle, and a driving condition of the vehicle.

5. The method according to claim 1, wherein the calculating of the DTE is performed in a remote server, and a calculation result of the server is transmitted to the vehicle.

6. The method according to claim 1, further comprising displaying on the display of the vehicle:
   a map,
   a representation of the vehicle, and
   a representation of an area on the map in which vehicle is able to travel with the current energy level of the vehicle.

7. The method according to claim 1, wherein the sub-set of status information values of the vehicle is a position of the vehicle.

8. The method according to claim 1, further comprising:
   transmitting from the vehicle to a remote server the status information values; and
   receiving from the remote server the DTE and the updated DTE.

9. A method of displaying a distance to empty (DTE) in a vehicle, the method comprising:
   collecting, by a controller, preset state information of the vehicle;
   receiving, from a server, a calculated DTE reachable with a current energy level of the vehicle by incorporating into the calculation all values of preset status information of the vehicle;
   displaying, by the controller, the calculated DTE on a display installed inside the vehicle;
   receiving, from the server, a recalculated DTE to generate an updated DTE by incorporating into the recalculation only a part of values of the preset status information of the vehicle, the part of the values including values that have changed since the calculating step;
   replacing, by the controller, the DTE displayed on the display with the updated DTE; and
   periodically repeating the step of recalculating the DTE to generate an updated DTE.

10. The method according to claim 9, wherein the status information of the vehicle includes at least one of a position of the vehicle, a remaining amount of fuel in the vehicle, and a driving condition of the vehicle.

11. The method according to claim 9, wherein the calculating of the DTE is performed in a remote server, and a calculation result of the server is transmitted to the vehicle.

12. The method according to claim 9, further comprising displaying on the display of the vehicle:
   a map,
   a representation of the vehicle, and
   a representation of an area on the map in which vehicle is able to travel with the current energy level of the vehicle.

13. The method according to claim 9, further comprising determining all possible routes based upon a location of the vehicle and calculating the DTE reachable with a current energy level of the vehicle for the all possible routes.

14. The method according to claim 9, wherein the part of the values of the preset status information of the vehicle that have changed since the calculating step is a position of the vehicle.

15. A system for displaying a distance to empty (DTE) of a vehicle, the system comprising:
   a server configured to calculate a first DTE reachable with a current energy level of the vehicle based on a first set of status information values of the vehicle using a set of computations, and to calculate a subsequent DTE based on a subsequent set of status information values of the vehicle, wherein at least one value of the subsequent set of status information values of the vehicle is different from a corresponding value of the first set of status information values of the vehicle (a Different Value), and wherein the subsequent DTE is calculated by performing only a sub-set of computations the sub-set being defined as those computations necessary to reflect the impact of the Different Value on the subsequent DTE relative to the first DTE; and an audio video navigation system configured to receive the first DTE from the server to display the first DTE on a display, and receive the subsequent DTE from the server to replace the first DTE displayed on the display with the subsequent DTE.

16. The system according to claim 15, wherein the first DTE is calculated by reflecting the impact of all values of the first set of status information values of the vehicle on the first DTE.

17. The system according to claim 16, wherein subsequent DTEs are repeatedly determining a Different Value and performing computations necessary to reflect the impact of the Different Value on the subsequent DTE relative to the first DTE after the calculation of the first DTE is completed.

18. The system according to claim 15, wherein the status information of the vehicle includes at least one of a position of the vehicle, a remaining amount of fuel in the vehicle, and a driving condition of the vehicle.

19. The system according to claim 15, wherein the DTE displayed on the display indicates an area around the vehicle representing an area the vehicle can travel with the current energy level.

20. The system according to claim 15, further comprising determining all possible routes based upon a location of the vehicle and calculating the first DTE and the subsequent DTE for the all possible routes.

* * * * *